May 9, 1939.  C. R. RICHTER  2,157,269
TORCH FOR WELDING, CUTTING, AND THE LIKE
Filed May 22, 1936
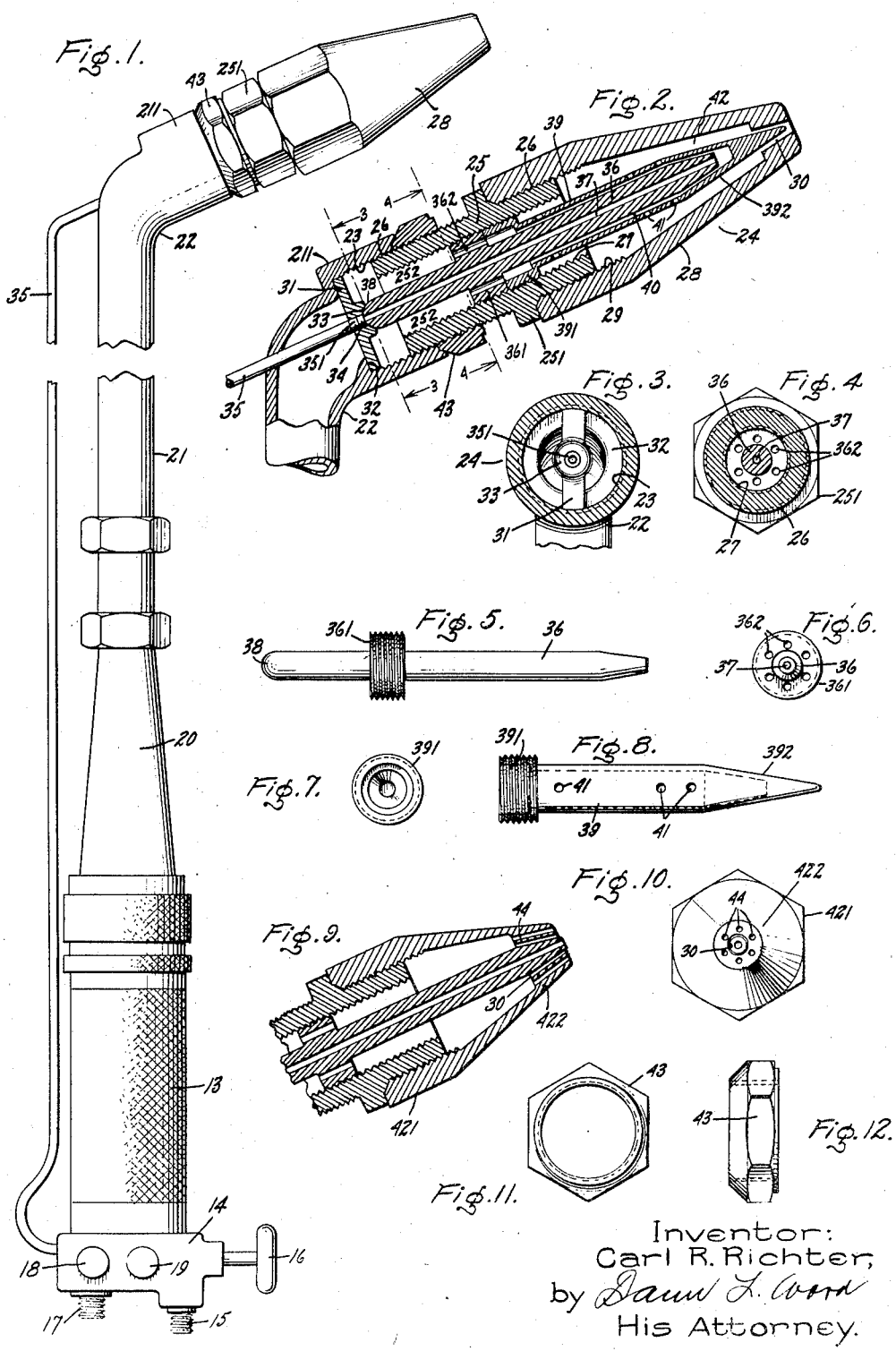
Inventor:
Carl R. Richter,
by Daniel L. Ward
His Attorney.

Patented May 9, 1939

2,157,269

UNITED STATES PATENT OFFICE 2,157,269

TORCH FOR WELDING, CUTTING, AND THE LIKE

Carl R. Richter, Schenectady, N. Y.

Application May 22, 1936, Serial No. 81,169

8 Claims. (Cl. 158—27.4)

My invention is particularly intended for use with city gas or other low B. t. u. gases, although, by making slight adjustments, it is equally suitable for use with high B. t. u. gases such as acetylene and oxygen. Heretofore, in attempts to use city gas or other low B. t. u. gases for welding or cutting it has been found that with the ordinary equipment designed for use with high B. t. u. gases, there was not adequate mixing with the result that the use of the economical low B. t. u. gases for welding and cutting purposes has not become commercially successful. In my Patent No. 2,104,761, January 11, 1938, is disclosed a blow torch in which the gases are sufficiently mixed to permit the use of low B. t. u. gases advantageously and successfully. My present invention is an improvement over the invention covered by said application.

One of the objects of my present invention is the provision of a tip for welding, cutting and preheating in which the needle valve, either the welding needle or the cutting needle may readily be adjusted with respect to the casing in which it is mounted thereby making it possible to adjust the discharge opening in the nozzle of the torch to the character of work to be performed, or for the type of gas that is to be used.

Another object of my invention is the provision of a welding tip comprising a cutting needle and a welding needle and in which either may readily be removed or replaced. To provide a cutting tip, the welding needle is removed and the tip suitably adjusted with respect to the cutting needle, and to make a welding tip, the cutting needle is rendered inoperative and the welding needle inserted. It will be understood, however, that the cutting tip may be entirely removed while the welding tip is being used. Furthermore, by suitably adjusting the welding needle, the same may be used for preheating.

Other novel features of my invention will appear in the specification and will be particularly pointed out in the claims.

My invention will best be understood by reference to the accompanying drawing in which I have illustrated a preferred embodiment thereof and in which Fig. 1 is a side view of a blow torch equipped with a torch tip embodying my invention;

Fig. 2 is a longitudinal section through the tip;

Fig. 3 is a section taken along the plane of the line 3—3 of Fig. 2;

Fig. 4 is a section taken along the plane of the line 4—4 in Fig. 2;

Fig. 5 is a side view of a cutting needle suitable for use in my invention;

Fig. 6 is a front elevation of the needle shown in Fig. 5;

Fig. 7 is an end view of the left end of the welding needle illustrated in Fig. 8;

Fig. 8 is a side view of the welding needle;

Fig. 9 is a fragmentary sectional view through a modified form of the tip;

Fig. 10 is a front end view of the tip of Fig. 9;

Fig. 11 is a front view of a threaded nut, and

Fig. 12 is a side view of Fig. 11.

Like reference characters indicate like parts throughout the drawing.

Referring to the drawing, 13 indicates the handle of a blow torch embodying my invention provided at its lower end with a valve casing 14 having a gas inlet 15 controlled by a valve the handle of which is indicated at 16. Also provided in the valve casing 14 is an oxygen inlet 17 controlled by a quick closing valve member 18. A third control valve 19 is provided for a purpose hereinafter referred to.

A mixing chamber which may be of the same or similar character to that disclosed in my said patent is provided within a conical shaped portion 20 of the casing. Reference is made to my said patent for details of said mixing chamber. The outer end of the torch pipe, indicated generally at 21, is preferably bent angularly as at 22 and is internally threaded as at 23 to receive the welding, cutting and heating tip indicated generally at 24 in Fig. 2.

In the embodiment of my invention illustrated, the tip comprises a body portion 25 the ends of which are externally threaded as at 26 and internally threaded as at 27. The externally threaded portion 26 at the rear end of the body is received in the threaded portion 23 of the outer enlarged end 211 of the torch pipe. The nozzle 28 is internally threaded at one end as at 29 and is received on a threaded end of the body portion 25. An intermediate portion 251 of the body portion is preferably larger than the end portions and forms an abutment and forms a substantially fluid tight joint with the end of the nozzle 28. The free end of the nozzle 28 is provided with a conical opening 30.

A spider 31 is preferably mounted in the end 211 of the torch pipe and engages an annular shoulder 32 formed therein. The spider is provided with a seat 33 and an opening 34 in which the end 351 of the oxygen supply tube 35 is received, preferably by a threaded engagement therewith, as illustrated. It will be understood, however, that the pipe 35 may be disposed inside the casing of the torch. Any suitable valve arrangement 19 may be provided in the valve casing 14 or torch handle 13 whereby the said valve may be operated to open or close the pipe 35 in addition to the ordinary oxygen supply within the handle.

A cutting needle 36 is provided with a passage 37 for oxygen extending axially therethrough as indicated in Fig. 2 and is provided with an enlarged portion 361 preferably threaded, in the embodiment here illustrated, on its exterior, the enlarged threaded portion being received in the threaded opening formed in the body 25 and adjustable axially therealong. The enlarged portion 361 of the needle is provided with a plurality of passages 362 communicating with a space 252 within the rear portion of the body 25 as best indicated in Figs. 2 and 6. The inner end of the needle 36 is preferably rounded as at 38 and engages the seat 33 formed on the spider, the end 351 of the oxygen supply pipe 35 thus communicating with the passage in the cutting needle.

A welding needle 39 is likewise provided with an enlarged externally threaded portion 391 which is received in the internally threaded portion of the body 25 so that the same may be adjusted axially thereof. The welding needle 39 is provided with a conically shaped pointed end 392 which enters the conical opening 30 in the end of the nozzle. By providing a limited number of nozzles, usually three or four, having different sized openings 41, I am enabled to carry out desired welding operations with gases of low or high B. t. u. value on metal varying in thickness and other characteristics by placing on the tip an appropriate nozzle having an opening of a size to adapt the same to the character of welding operation to be performed. The largest of these nozzles may be used for cutting and preferably that nozzle having the largest conical opening is used with the cutting needle. The interior of the welding needle 39 is somewhat greater than the external diameter of the cutting needle to provide a space 40 between the two. The welding needle is provided with a plurality of lateral openings 41 as indicated in Figs. 2 and 8 through which the gas which is admitted to the space 40 between the welding needle and the cutting needle flows to a chamber 42 between the welding needle and the nozzle 28 thereby producing a further mixing of the gases and exerting a cooling effect upon the nozzle 28, which, in turn heats the gases, a feature which is highly desirable.

In carrying out a welding operation, the cutting needle 36 may, if desired, remain in the tip during such operation in the position illustrated in Fig. 2, it being understood that the supply of oxygen to the cutting needle is at this time cut off by the valve 18. The gases appropriate for welding and which are controlled by the valves 18 and 19 flow through suitable passages to the mixing chamber of the character illustrated in my said patent. From the mixing chamber the gases flow through the torch pipe 21 around the spider 31 to the chamber 252 from which they flow through the openings 362 of the enlarged portion of the cutting needle to the space 40 between the cutting and the welding needle and thence through the openings 41 in the welding needle to the chamber 42 and thence through the conical opening 30. I find that with the parts arranged about as shown in Fig. 2 that the welding tip is suited for operation on all kinds of metal and of variable thickness and for various gases. It will, of course, be understood that the cutting needle may, if desired, be removed from the tip prior to the welding operation though I find in practice that it is unnecessary to do so.

In accordance with my invention, the parts are so constructed and arranged that in order to convert the welding tip to a cutting tip it is only necessary to remove the welding needle and suitably adjust the nozzle with respect to the cutting needle. The nozzle is first removed, the part 361 of the cutting needle is moved along the body member 25 until the conical end of the cutting needle is disposed, when the nozzle is replaced, within the conical opening in the end of the nozzle and with its end substantially flush with the end of the nozzle. The nozzle is then again placed in position on the body member, and with the inner end of the cutting needle engaging the seat 33 in the spider and with the rear end of the nozzle engaging the annular shoulder 251 and forming a substantially fluid tight joint therewith. When the cutting needle is thus adjusted, the lock nut which is bevelled at its rear side in the manner indicated in Fig. 2 engages the bevelled forward end of the torch pipe and forms a fluid tight joint therewith and the torch is then ready to carry out a cutting operation.

By providing a body member on which both the welding needle and the cutting needle are removably mounted, it is possible for the operator to remove both needles and weld with the nozzle in an emergency. It will be understood that the openings 41 in the welding needle offer a considerable resistance to the flow of gases which in some cases make it inadvisable to weld with low pressure low B. t. u. gases.

In Figs. 9 and 10 I have shown a modification of my invention in which a plurality of mixed gas passages 44 are provided in the tip 422 surrounding the conical opening 30 for providing an additional preheating flame which increases the cutting speed and eliminates interruptions when cutting rusty and greasy metals. By providing the cutting needle with a conical end and providing a conical opening in the nozzle surrounding the end of the cutting needle and a plurality of passages 44 in the general form of a cone as shown in Figs. 9 and 10, the metal which is to be cut is quickly brought to a melting point and a cutting operation quickly started. The conical flame from the annular passage 30 converges to a limited surface on the metal and quickly destroys any grease, dirt or other foreign matter on the surface of the metal which is to be cut and any such foreign material on the surface of the metal immediately surrounding the portion engaged by the first flame is also destroyed thereby preventing contamination of the metal engaged by said first flame. By the use of the modified nozzle illustrated in Figs. 9 and 10, the metal is quickly preheated and a cutting operation is rapidly and satisfactorily produced. The annular passage and the surrounding passages which converge towards surfaces immediately surrounding the point of the metal which is to be cut cooperate in providing quick starting of the cutting operation and one that is efficient and satisfactory.

In accordance with my invention sufficient heat is produced to provide better welding and cutting than has been produced with any torch with which I am familiar irrespective of the gases used. This result is attributable, in part at least, to the fact that thorough mixing of the gases in the equipment is produced, the gas being mixed in the mixing chamber of the character described in my said patent and by the gas spreader associated with said mixing chamber. It is further mixed by the spider around which it flows. Then, in case a welding operation is being carried out, it is further mixed by passing through the openings 41 in the welding needle and finally by passing through the opening formed in the nozzle between the tip of the needle and the walls surrounding the conical opening formed in the nozzle. Furthermore, the foregoing results are secured without changing the tips, it being necessary only to insert the appropriate needle in the same torch. Furthermore, one tip only is necessary for carrying out welding, cutting and preheating operations, thereby eliminating additional tips which have hitherto been considered necessary. Again, a torch which is suitable for use with city gas may readily be converted to one with which high B. t. u. gases may be used. A further advantage in my invention resides in the fact that the speed of the torch in welding and cutting operations is increased.

While I have described my invention in its preferred embodiment it is to be understood that the words which I have used are words of description rather than of limitation and that changes within the purview of the appended claims may be made without departing from the true scope and spirit of my invention in its broadest aspects.

What I claim is:

1. In a welding torch, a torch pipe, means for admitting gas and oxygen to said torch pipe, a body member supported at the forward end of said torch pipe, a nozzle supported on said body member, said nozzle being provided at its forward end with a conical opening, a welding needle supported on said body member in spaced relation to said nozzle, the forward end of said welding needle being closed, a cutting needle disposed within said welding needle, a passage extending longitudinally of said cutting needle, means for introducing oxygen to said cutting needle, the forward end of said cutting needle being disposed within the closed end of said welding needle, and said welding needle being provided with openings for admitting gases therefrom to the space between said welding needle and said nozzle.

2. In a blow torch, a torch pipe, means for supplying gas and oxygen to said torch pipe, a spider mounted in the forward end of said torch pipe, said spider being provided with an opening, a body member mounted on the forward end of said torch pipe and movable therealong, a nozzle forming a substantially fluid tight joint with said body member, said nozzle being provided with a cone shaped opening at its forward end, a cutting needle mounted on said body member and movable therealong and having its end seated against said spider with the passage therethrough communicating with the opening in said spider, means for supplying oxygen to said opening in said spider, a welding needle supported on said body member and movable therealong, said welding needle being disposed between said cutting needle and said nozzle in spaced relation to each other, and means for supplying mixed gas and oxygen from said torch pipe to the space between said welding needle and said cutting needle.

3. In a blow torch, a torch pipe, means for supplying gas and oxygen thereto, a body member mounted on the forward end of said torch pipe and movable therealong, a nozzle mounted on said body member and forming a fluid tight joint therewith, said nozzle being provided at its forward end with a conical opening, a welding needle mounted on said body member and provided with a conical tip receivable in said opening, and a cutting needle disposed within said welding needle and supported on said body member and provided with a conical tip receivable, when said welding needle is removed, in the conical opening in said nozzle.

4. In a blow torch, a torch pipe, means for supplying gas and oxygen thereto, a body member mounted on the forward end of said torch pipe and movable therealong, said body member being provided with an annular shoulder, a nozzle mounted on the forward end of said body member, the inner end of said nozzle engaging the said shoulder and forming a substantially fluid tight joint therewith, said nozzle being provided at its forward end with a conical opening, a welding needle supported on said body member and provided with a conical tip, and a cutting needle disposed within said welding needle and supported on said body member and provided with a conical tip receivable, when said welding needle is removed, in the conical opening in said nozzle.

5. In a blow torch, a torch pipe, means for supplying gas and oxygen thereto, a hollow body member mounted on the forward end of said torch pipe and movable therealong, said body member being provided with an annular shoulder, a nozzle mounted on the forward end of said body member, the inner end of said nozzle engaging the said shoulder and forming a substantially fluid tight joint therewith and provided at its forward end with a conical opening, a welding needle supported on the inner side of said body member and provided with a conical closed tip and a cutting needle disposed within said welding needle and supported within said body member.

6. In a blow torch, a torch pipe, means comprising inlets for conducting gas and oxygen to said pipe, a tip supported on the forward end of said pipe and comprising a nozzle provided with a conical opening at its forward end, a cutting needle provided with a longitudinally extending passage and disposed within and in spaced relation to said nozzle with its forward end conical in form and disposed within the opening in said nozzle and spaced therefrom, means for supplying oxygen to said cutting needle, the end of said nozzle being provided with openings converging towards the free end of said nozzle and surrounding said conical opening, and means for conducting mixed gas and oxygen from said pipe to the space between the end of said cutting needle and the wall surrounding said conical opening and to said opening.

7. A tip for a cutting torch comprising a nozzle formed with a conical opening at its forward end and provided with a plurality of spaced passages surrounding said opening and converging toward the free end of said nozzle, and a cutting needle provided with a conical tip disposed within said conical opening in said nozzle and spaced from the nozzle walls surrounding said opening to form an annular passage, said cutting needle being provided with a passage extending longitudinally thereof, means for supplying oxygen to said passage in said cutting needle and means for supplying mixed gas and oxygen to said annular passage and to said openings in said nozzle.

8. In a blow torch, a torch pipe, a hollow body member supported at the forward end of said torch pipe and forming a substantially fluid tight joint therewith, a nozzle supported on said body member and movable therealong and provided at its front end with a conical opening, a cutting needle provided with an enlarged portion engageable with the interior of said body member and movable therealong, said cutting needle being provided with a conical tip receivable in the conical opening in said nozzle, the parts defining chambers for mixed gases at the rear and front, respectively, of said enlarged portion of said cutting needle, said enlarged portion being provided with passages communicating with said chambers, means for supplying mixed gases to said rear chamber, said front chamber communicating with said conical opening in said nozzle, said cutting needle being provided with a longitudinally extending passage leading to said conical tip, and means for supplying a desired cutting gas to said passage.

CARL R. RICHTER.